June 29, 1926.

S. J. RAETZ 1,590,315

CAR TRUCK CONSTRUCTION

Filed Jan. 19, 1925

Witness:

Inventor
Stephen J. Raetz
Atty

June 29, 1926.
S. J. RAETZ
1,590,315
CAR TRUCK CONSTRUCTION
Filed Jan. 19, 1925  2 Sheets-Sheet 2
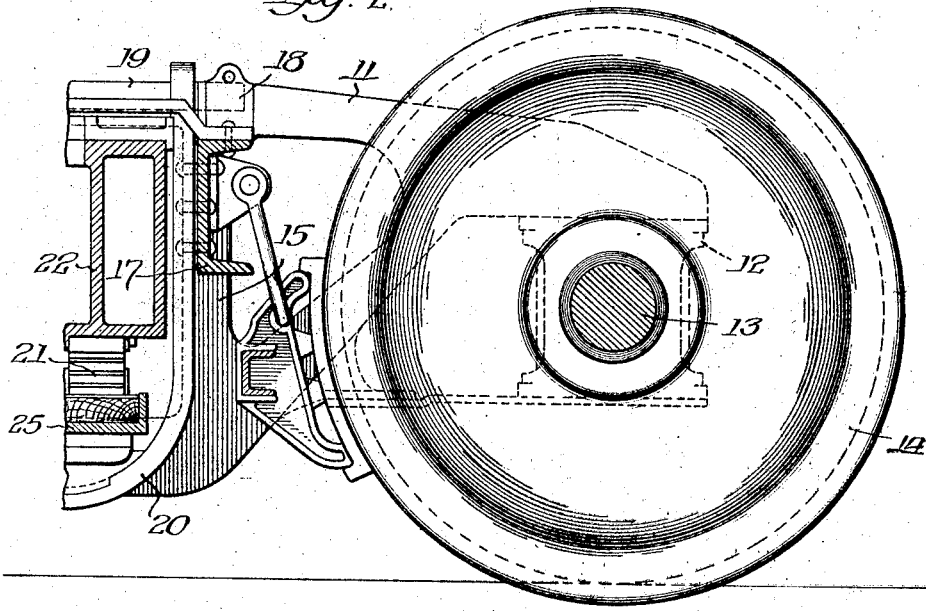
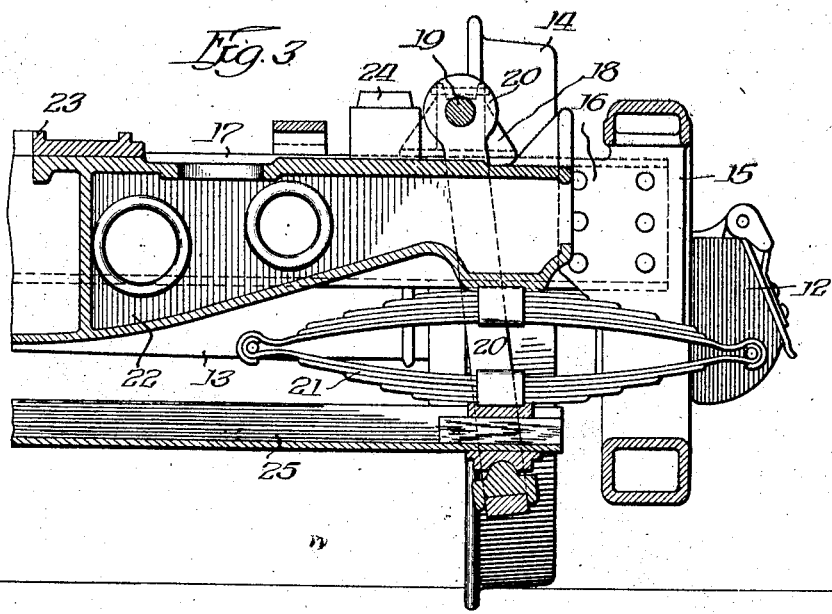
Witness:
Inventor
Stephen J. Raetz Patented June 29, 1926.

1,590,315

UNITED STATES PATENT OFFICE.

STEPHEN J. RAETZ, OF PROCTOR, MINNESOTA.

CAR-TRUCK CONSTRUCTION.

Application filed January 19, 1925. Serial No. 3,393.

This invention relates to a new and improved car truck and truck side frame construction, and more particularly to a construction of the swing motion type.

A structure permitting a swinging motion between the car truck and car body is desirable in order to prevent the transmission of side jolts to the car body from the truck and also to prevent side sway of the car body from affecting the truck stability on the track.

It is an object of the present invention to provide a side frame and truck construction whereby a swinging connection may be efficiently made between a car body and an integral side frame, and more particularly a cast steel side frame having column guide bearings.

It is a further object to provide a side frame of this character having integral brackets for connection to cross transoms.

Other and further objects will appear as the description proceeds.

I have illustrated a preferred form of my invention in the accompanying drawings, in which—

Fig. 2 is a longitudinal section of Fig. 1;

Fig. 3 is a transverse section of Fig. 1, and

Figure 1:
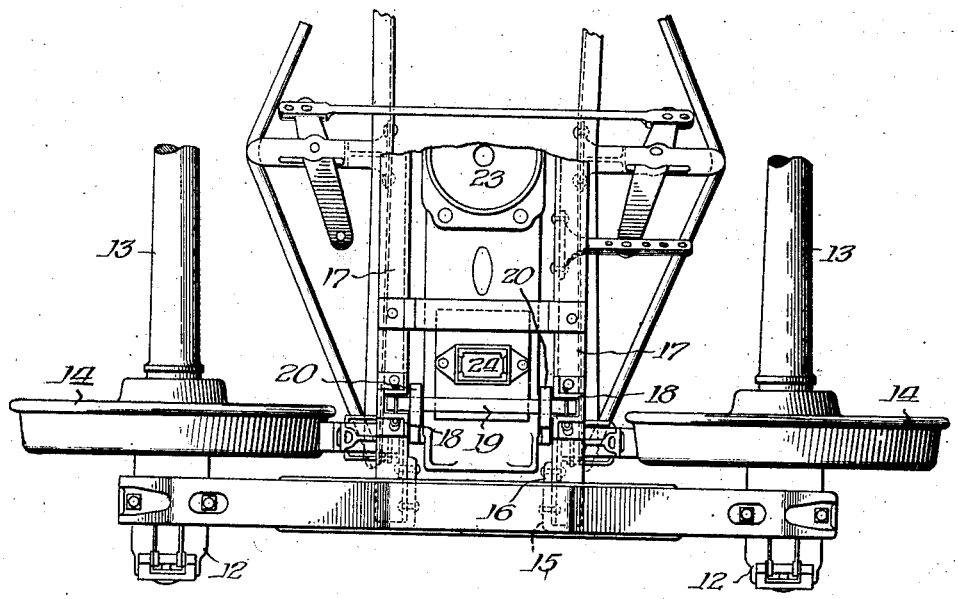
Fig. 1 is a plan view of half a truck equipped with my invention.
Figure 4:
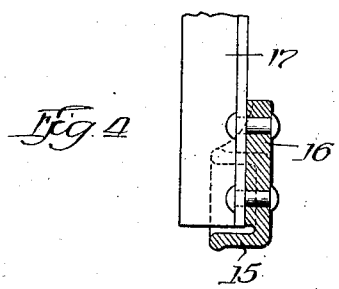
Fig. 4 is a detail section showing the cross transom connection.

The truck shown comprises the side frames 11 carrying the journal boxes 12 fitted upon the axles 13, which latter are secured to wheels 14. The side frames 11 are provided with the column guide members 15 from which extend the cross transom securing brackets 16.

The cross transoms 17 are riveted to the brackets 16 and carry the hanger bearings 18. The shafts 19 are supported in the hanger bearings 18 and in turn support the hangers 20. The spring plank 25 is supported on the hangers 20 and carries the springs 21, upon which is supported the bolster 22. The car load is carried on the center 23 of the bolster 22 and on the buffers 24.

In the use of the construction shown, relative motion between the car body and car truck is permitted by the swinging connection between the bolster and the truck cross transoms and side frames. The hanging connection is such that the car body is normally centered relative to the trucks by gravity. Due to this form of connection, lateral shocks will not be directly transmitted from the trucks to the car body and, conversely, side sway of the car body will not tend to rock or lift the car truck.

The integral lugs extending inwardly from the side frames permit an efficient and compact connection of the cross transoms to the side frames. The transoms shown are of channel section and are placed vertically so as to afford great strength while taking up but little space, thus permitting the hangers and spring planks to be supported between the transoms.

I have shown one specific form of construction by way of illustration, but it is to be understood that I contemplate such changes and modifications as come within the spirit and scope of the appended claims.

I claim:

1. A car truck comprising a pair of cast steel arch bar side frames having vertical column guide members, integral brackets extending inwardly from the column guide members, cross transoms riveted to the brackets, said transoms consisting of outwardly facing vertically placed channel sections, hangers pivotally supported on said transoms and located between them, and a car bolster supported from said hangers.

2. A car truck comprising a pair of cast steel side frames, having inwardly projecting brackets integral therewith, transom beams connected to said brackets, bearing members upon the upper side of the transoms, a transverse bar carried by said bearing members, U-shaped hangers having their ends pivotally supported on the bar, and a bolster swung upon said hangers.

3. A car truck comprising a pair of cast steel side frames, having inwardly projecting brackets integral therewith, transom beams connected to said brackets, bearing members upon the upper side of the transoms, a transverse bar carried by said bearing members, one piece rigid U-shaped hangers having their ends pivotally supported on said bar and located between the transoms, and a bolster swung upon said hangers.

Signed at Proctor, Minnesota, this 5th day of January, 1925.

STEPHEN J. RAETZ.